United States Patent
Kobayashi et al.

(10) Patent No.: US 8,267,802 B2
(45) Date of Patent: Sep. 18, 2012

(54) FIXED-TYPE, CONSTANT-VELOCITY UNIVERSAL JOINT

(75) Inventors: Tomoshige Kobayashi, Iwata (JP); Kenta Yamazaki, Iwata (JP); Teruaki Fujio, Iwata (JP)

(73) Assignee: NTN Corporation, Osaka (JP)

( * ) Notice: Subject to any disclaimer, the term of this patent is extended or adjusted under 35 U.S.C. 154(b) by 86 days.

(21) Appl. No.: 12/988,661

(22) PCT Filed: May 7, 2009

(86) PCT No.: PCT/JP2009/058605
§ 371 (c)(1),
(2), (4) Date: Oct. 20, 2010

(87) PCT Pub. No.: WO2009/145035
PCT Pub. Date: Dec. 3, 2009

(65) Prior Publication Data
US 2011/0034255 A1     Feb. 10, 2011

(30) Foreign Application Priority Data

May 30, 2008  (JP) ................................ 2008-142386
May 30, 2008  (JP) ................................ 2008-142402

(51) Int. Cl.
*F16D 3/224*  (2011.01)
(52) U.S. Cl. ........................... 464/145; 464/15; 464/906
(58) Field of Classification Search ................. 464/8, 9, 464/15, 139, 140, 144, 145, 146, 906
See application file for complete search history.

(56) References Cited

U.S. PATENT DOCUMENTS

| | | | | |
|---|---|---|---|---|
| 4,494,941 A | * | 1/1985 | Hirai et al. | 464/145 |
| 4,589,857 A | * | 5/1986 | Okoshi | 464/145 |
| 5,064,298 A | * | 11/1991 | Hibi et al. | |
| 5,122,096 A | * | 6/1992 | Auckter et al. | 464/145 |

(Continued)

FOREIGN PATENT DOCUMENTS

EP     1 209 372     5/2002

(Continued)

OTHER PUBLICATIONS

International Search Report issued Aug. 11, 2009 in International (PCT) Application No. PCT/JP2009/058605.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint is capable of securing a ball groove depth larger than conventional products and enhancing performance without an increase in a "force of pushing out balls in an axial direction", the force having an influence on joint efficiency. In the fixed type constant velocity universal joint, a center of each of a plurality of guide grooves of an outer joint member and a center of each of a plurality of guide grooves of an inner joint member are offset with respect to a spherical surface center of an inner surface and a spherical surface center of an outer surface. A ratio (F/PCR) of an offset amount F to a length of a segment (PCR) ranges from 0.045 to 0.065. A ratio ($\alpha t/\alpha$) when an angle $\alpha$ is the total of an angle $\alpha t$ and an angle $\alpha c$ ranges from 0.45 to 0.65.

20 Claims, 11 Drawing Sheets

U.S. PATENT DOCUMENTS

| | | | |
|---|---|---|---|
| 5,642,947 A * | 7/1997 | Akamatsu et al. | |
| 6,120,382 A | 9/2000 | Sone et al. | |
| 6,383,082 B1 * | 5/2002 | Declas | 464/145 |
| 6,736,729 B2 * | 5/2004 | Wang et al. | 464/15 |
| 7,413,515 B2 * | 8/2008 | Nakagawa et al. | 464/146 |
| 2001/0002369 A1 | 5/2001 | Kobayashi et al. | |
| 2003/0017877 A1 | 1/2003 | Kobayashi et al. | |
| 2005/0059497 A1 * | 3/2005 | Goto et al. | |
| 2005/0079918 A1 | 4/2005 | Kobayashi et al. | |
| 2005/0284434 A1 | 12/2005 | Tsuruta et al. | |
| 2006/0211503 A1 * | 9/2006 | Suzuki et al. | 464/145 |
| 2006/0217207 A1 * | 9/2006 | Hoshino et al. | 464/145 |
| 2009/0197688 A1 | 8/2009 | Ushioda et al. | |
| 2010/0087261 A1 * | 4/2010 | Kura et al. | |
| 2010/0087262 A1 * | 4/2010 | Une et al. | 464/145 |

FOREIGN PATENT DOCUMENTS

| | | |
|---|---|---|
| EP | 1 512 879 | 3/2005 |
| EP | 2 080 922 | 7/2009 |
| GB | 2 155 149 | 9/1985 |
| JP | 9-317783 | 12/1997 |
| JP | 09-317784 | 12/1997 |
| JP | 2003-4062 | 1/2003 |
| JP | 2006-9080 | 1/2006 |
| JP | 2007-298086 | 11/2007 |
| JP | 2008-64291 | 3/2008 |
| WO | 2008/032532 | 3/2008 |

OTHER PUBLICATIONS

International Preliminary Report on Patentability and Written Opinion of the International Searching Authority issued Jan. 20, 2011 in International (PCT) Application No. PCT/JP2009/058605.

Supplementary European Search Report issued Apr. 5, 2012 in corresponding European Patent Application No. 09754543.8.

* cited by examiner

FIXED-TYPE, CONSTANT-VELOCITY UNIVERSAL JOINT

TECHNICAL FIELD

The present invention relates to a fixed type constant velocity universal joint, and more specifically, to a fixed type constant velocity universal joint which is used in a power transmission system for automobiles and various industrial machines, and which allows only angular displacement between two shafts, that is, a driving shaft and a driven shaft.

BACKGROUND ART

For example, a fixed type constant velocity universal joint can be taken as an example of a constant velocity universal joint used as means for transmitting a rotational force from an engine to wheels of an automobile at a constant velocity. The fixed type constant velocity universal joint has a structure in which two shafts, a driving shaft and a driven shaft, are coupled to each other and which is capable of transmitting rotational torque at a constant velocity even when the two shafts form an operating angle. Generally, as disclosed, for example, in Patent Literatures 1 and 2, a Birfield type (BJ) constant velocity universal joint and an undercut-free type (UJ) constant velocity universal joint have been widely known as the above-mentioned fixed type constant velocity universal joint.

For example, as illustrated in FIG. 7, the fixed type constant velocity universal joint of the undercut-free type (UJ) includes: an outer race 3 having an inner surface 1 in which a plurality of guide grooves 2 are equiangularly formed along an axial direction and serving as an outer joint member; an inner race 6 having an outer surface 4 in which a plurality of guide grooves 5 are equiangularly formed in pairs with the guide grooves 2 of the outer race 3 along the axial direction and serving as an inner joint member; a plurality of balls 7 interposed between the guide grooves 2 of the outer race 3 and the guide grooves 5 of the inner race 6, for transmitting torque; and a cage 8 interposed between the inner surface 1 of the outer race 3 and the outer surface 4 of the inner race 6, for retaining the balls 7. In the cage 8, a plurality of window portions 9 for housing the balls 7 are arranged along a circumferential direction.

A groove bottom of each of the guide grooves 2 of the outer race 3 is constituted by an opening-side straight portion 2a (linear portion parallel to the axial direction of the outer race 3) and an interior-side circular-arc portion 2b. A groove bottom of each of the guide grooves 5 of the inner race 6 is constituted by an opening-portion-side circular-arc portion 5a and an interior-side straight portion 5a (linear portion parallel to the axial direction of the inner race 6).

In this case, a center curvature O1 of each of the guide grooves 2 of the outer race 3 and a center O2 of each of the guide grooves 5 of the inner race 6 are offset to opposite sides in the axial direction by equal distances F with respect to a spherical surface center O3 of the inner surface 1 and a spherical surface center O4 of the outer surface 4, respectively.

Further, as illustrated in FIG. 8, the fixed type constant velocity universal joint of the Birfield type (BJ) includes: an outer race 13 having an inner surface 11 in which a plurality of guide grooves 12 are equiangularly formed along an axial direction and serving as an outer joint member; an inner race 16 having an outer surface 14 in which a plurality of guide grooves 15 are equiangularly formed in pairs with the guide grooves 12 of the outer race 13 along the axial direction and serving as an inner joint member; a plurality of balls 17 interposed between the guide grooves 12 of the outer race 13 and the guide grooves 15 of the inner race 16, for transmitting torque; and a cage 18 interposed between the inner surface 11 of the outer race 13 and the outer surface 14 of the inner race 16, for retaining the balls 17. In the cage 18, a plurality of window portions 19 for housing the balls 17 are arranged along a circumferential direction.

In this case, a groove bottom of each of the guide grooves 12 of the outer race 13 and each of the guide grooves 15 of the inner race 16 is constituted only by a circular-arc portion. The center curvature O2 of each of the guide grooves 15 of the inner race 16 and the center curvature O1 of each of the guide grooves 12 of the outer race 13 are offset oppositely to each other in the axial direction by equal distances k and k with respect to a joint center O.

Generally, an operating angle of an automotive fixed type constant velocity universal joint (constant velocity universal joint on a tire side) used for driving of tires of front wheels thereof is set to be low in a straight-advancing state (approximately from 0 to 10 degrees). When an automobile turns, the constant velocity universal joint forms a high angle in accordance with a steering angle. In consideration of general use situations of automobiles, high-angle steering is less-frequently required (garage parking, junctions, and the like), and the constant velocity universal joint is used almost always in the straight-advancing state, that is, at low operating angles. In this context, fuel efficiency improvement of automobiles can be expected by efficiency improvement of the fixed type constant velocity universal joint (reduction of frictional loss) at low operating angles.

Regarding the efficiency improvement of the fixed type constant velocity universal joint, there has been provided a method of realizing a high-efficiency and compact fixed type constant velocity universal joint with use of small-diameter balls 17 and by setting of a track offset amount k' (k'<k) to be small as illustrated in FIG. 11 (Patent Literatures 1 and 2). As just described, by adoption of the small-diameter balls and the small track offset, differences in movement distance between the inner race 16 and the balls 17 and between the outer race 13 and the balls 17 are reduced. As a result, a relative sliding speed of the balls 17 and the guide grooves 12 of the outer race 13 is reduced, which leads to enhancement in efficiency.

That is, in comparison with the constant velocity universal joint illustrated in FIG. 8 and the constant velocity universal joint in which small track offset is achieved as illustrated in FIG. 11, a wedge angle of the ball 17 is $\beta$ in the constant velocity universal joint illustrated in FIG. 8, and a wedge angle of the ball 17 is $\beta'$ in the constant velocity universal joint illustrated in FIG. 11, the wedge angle $\beta'$ being lower than the wedge angle $\beta$. As illustrated in FIGS. 9 and 12, a force of pushing out the ball 17 in the axial direction is reduced as indicated by F and F'. With reduction of the force of pushing the ball 17 in the axial direction, a force of the ball 17 by which the cage 18 is pressed against spherical surfaces of the inner and outer races, that is, a spherical surface force is reduced. As a result, frictional loss on the contact portions is reduced, which leads to enhancement in efficiency.

FIG. 10 illustrates a case where the constant velocity universal joint illustrated in FIG. 8 forms an operating angle (40 degrees), and FIG. 13 illustrates a case where the constant velocity universal joint illustrated in FIG. 11 forms an operating angle (40 degrees). In those figures, the line L1 is a trace of contact points of the outer race 13 and the ball 17, and the line L2 is a trace of contact points of the inner race 16 and the ball 17.

Incidentally, six balls 17 are used in the case illustrated in FIG. 8, and eight balls 17 are used in the case illustrated in FIG. 11. Comparison of lengths of the contact point traces and the like of those cases was made, the results of which are shown in Table 1 below.

TABLE 1

| Length ratio of contact point traces | | |
|---|---|---|
| | Eight balls | Six balls |
| Inner race | 1 | 1.53 |
| Outer race | 1.06 | 1.61 |
| Ball diameter ratio | 1 | 1.25 |
| Offset ratio | 1 | 1.68 |

Table 1 shows that the length of the contact point trace in the case of the six balls is longer than that in the case of the eight balls.

CITATION LIST

Patent Literature 1: JP 09-317784 A
Patent Literature 2: JP 2003-4062 A

SUMMARY OF INVENTION

Technical Problem

Although the efficiency of the constant velocity universal joint can be enhanced by adoption of the small-diameter balls and the small-offset structure, there is a limitation on design in consideration of balance with respect to a strength aspect. That is, the following contradictory features (A) and (B) appear.

(A) The efficiency is more enhanced as the ball diameter and the offset (track offset) are set to be smaller. However, when the ball diameter is set to be excessively small, the guide grooves corresponding thereto become shallower. Therefore, at the time of inputting high torque, the balls become more liable to climb onto shoulder portions of the guide grooves. As a result, strength at the time of formation of high angles is lowered. (B) The wedge angles of the balls are lower when the offset is set to be excessively small. As a result, a force for controlling the balls becomes insufficient, which causes operational failures such as trapping during operation.

As just described, in order to achieve reductions of the ball diameter and the offset, it has been necessary to effect designing while balance is maintained among three, i.e., strength, operability, and efficiency. That is, the conventional fixed type constant velocity universal joints have been poor in design properties.

Incidentally, as described above, the track offset represents the distances from the spherical surface centers of the outer and inner races to the centers of the guide grooves. In Patent Literatures 1 and 2 above, a ratio R1 (F/PCR) is set to range from 0.069 to 0.121 on the premise that, as illustrated in FIG. 7, the offsets are F and a length of a segment connecting the center curvature O1 of each of the guide grooves 2 of the outer race 3 or the center curvature O2 of each of the guide grooves 5 of the inner race 6 and a center O5 of each of the balls 7 to each other is PCR.

Further, in Patent Literature 1 above, core positions of outer and inner spherical surfaces of the retainer (cage) 8 are offset to each other in the axial direction by the equal distances with respect to the joint center (center of the balls) O. On the premise that a factor of amounts f of the offsets is R2 (f/PCR), the factor R2 is set to range from 0 to 0.052.

Incidentally, when the track offset amounts are excessively large, the track grooves are shallower. As a result, allowable load torque is lowered in a high-operating-angle region, and strength of the retainer is reduced owing to thinning of pillars of the retainer. In contrast, when the track offset amounts are excessively small, durability is reduced owing to an increase in track load, and in addition, a maximum operating angle is lowered. As just described, none of the excessively large and excessively small track offset amounts is preferred, and an optimum range thereof exists.

The optimum range of the offset amounts varies in accordance with a joint size, and hence it is necessary to calculate the optimum range in relation to basic dimensions representing the joint size. The optimum range in Patent Literature 1 is, with use of the ratio R1 (=F/PCR), $0.069 \leq R1 \leq 0.121$ in terms of reduction of the track load and securement of the following: allowable load torque, retainer strength, durability, and the maximum operating angle.

As described above, the fixed type constant velocity universal joints described in Patent Literatures 1 and 2 can be endowed with high durability and high efficiency while required strength is secured. However, in order to increase joint load capacity (increase depths of the track grooves), it is necessary to set the track offsets to be smaller than those described in Patent Literatures above. Unfortunately, when the track offsets are set to be small as just described, there arises a risk of deterioration in operability of the joint for the above-mentioned reason (B).

In view of the above-mentioned problem, the present invention has been made to provide a fixed type constant velocity universal joint capable of securing the ball groove depth larger in comparison with that of conventional products and enhancing performance without an increase in the "force of pushing out the balls in the axial direction" which has an influence on the joint efficiency.

Solution to Problem

According to the present invention, a fixed type constant velocity universal joint, includes: an outer joint member having an inner surface in which a plurality of guide grooves are formed; an inner joint member having an outer surface in which a plurality of guide grooves are formed; a plurality of balls interposed between the plurality of guide grooves of the outer joint member and the plurality of guide grooves of the inner joint member, for transmitting torque; and a retainer for retaining the plurality of balls, the fixed type constant velocity universal joint being of a track offset type in which a center of each of the plurality of guide grooves of the outer joint member and a center of each of the plurality of guide grooves of the inner joint member are offset to opposite sides in an axial direction by equal distances, respectively, with respect to a spherical surface center of the inner surface and a spherical surface center of the outer surface, in which R1 representing F/PCR falls within a range of $0.045 \leq R1 \leq 0.065$ on a premise that a track offset amount is F, and that a length of a segment connecting the center of each of the plurality of guide grooves of the outer joint member or the center of each of the plurality of guide grooves of the inner joint member and a center of each of the plurality of balls to each other is PCR, and in which as representing $\alpha t/\alpha$ falls within a range of $0.45 \leq As \leq 0.65$ on a premise that an angle formed between the following is $\alpha t$: a segment connecting a center of an outer surface of the retainer or a center of an inner surface of the retainer and the center of each of the plurality of balls to each other; and the segment connecting the center of each of the plurality of guide grooves of the outer joint member or the center of each of the plurality of guide grooves of the inner joint member and the center of each of the plurality of balls to each other, that an angle formed between the following is αc: the segment connecting the center of the outer surface of the retainer or the center of the inner surface of the retainer and the center of each of the plurality of balls to each other; and a line connecting a joint center and the center of each of the plurality of balls to each other, and that a total of the angles is α.

According to the present invention, the following can be achieved: the track offset amounts are reduced, and hence the spherical surface center of the outer surface of the retainer (cage) and the spherical surface center of the inner surface of the retainer (cage) are appropriately offset toward the respective centers of the guide grooves with respect to the joint center; and depths of the guide grooves are increased while total offset amounts equivalent to those of conventional products are secured. In accordance with an increase in the depths of the guide grooves, the contact angles (33° to 38°, for example) between the guide grooves and the balls can be increased. Still further, with securement of a retainer offset (cage offset), it is possible to compensate an influence of deterioration in operability, which is caused by reduction of the ratio R1 (small track offset).

By random arrangement of many fine recessed portions (for example, fine recessed portions each having a size of approximately several tens of μm) in a ball surface, a lubricating fluid bypasses contact portions on a smooth surface (contact portions with respect to counterpart rolling surfaces), and passes in the ball surface (steel ball surface) while an oil amount is increased in the fine recessed portions. That is, the fine recessed portions (micro oil pots) function so as to impart an oil retention effect to the steel ball surface and the counterpart rolling surfaces. In addition, with roughening, that is, by approximation of surface roughness of the steel ball to surface roughness of the counterpart rolling surfaces, an oil film layer can be reliably formed between the contact surfaces, that is, the steel ball surface and the counterpart rolling surfaces.

In this case, surface roughness Ra of the ball surface provided with the fine-recess-shaped depressions can be set to range from 0.03 to 1.0 μm, preferably, from 0.05 to 0.15 μm. An SK value of a surface roughness parameter can be set to −1.6 or less, preferably, to range from −4.9 to −1.6. Further, an area rate of the depressions can be set to range from 10 to 30%.

The surface roughness Ra is a value expressed in micrometers (μm), which is obtained by division of an area surrounded by a roughness curve and a center line by a length under a state in which the roughness curve is bent with respect to the center line. That is, the surface roughness Ra is arithmetic-average surface roughness Ra of an "oscillation average parameter in a height direction" among surface roughness parameters according to JIS B 0601-2001. The SK value of a parameter represents a skewness degree (skewness) of the roughness curve (ISO 4287:1997), and is used as a statistic as a measure for understanding of asymmetry of a spike-dip distribution. The SK value approximates 0 in a symmetrical distribution such as a Gaussian distribution, takes a negative value when spikes in the spike-dip distribution are deleted, and takes a positive value in a reverse case.

Other than the ball surface, the fine-recess-shaped depressions may be provided in a groove surface of each of the guide grooves of the inner joint member and a groove surface of each of the guide grooves of the outer joint member. When the surface roughness Ra of the ball surface or the guide surface of each of the guide grooves is set to range from 0.03 to 1.0 μm, the oil film layer can be reliably formed between the contact surfaces, that is, the ball surface and counterpart rolling surfaces (guide grooves) of the guide grooves. By setting of the SK value of the surface roughness parameter to −1.6 or less, the depressions stably serve as oil pools, and hence oil leakage is small in a sliding direction and an orthogonal direction even at the time of compression. As a result, excellent oil-film forming properties are obtained, good oil-film forming condition is achieved, and an effect of suppressing damage on the surface to the minimum is exerted. Further, by setting of the area rate of the depressions to range from 10 to 30%, many depressions for retaining the lubricating oil can be formed at random in the ball surface, and friction can be stably reduced.

The surface provided with the fine-recess-shaped depressions is formed by a barrel polishing process, shot blasting, shot peening, or the like. Barrel polishing is a method in which objects to be polished (workpieces) and polishing agents (media) are put into a container (barrel), and surface processings such as burr removal and rounding are performed with relative friction between the workpieces and the media generated by the movement of the barrel. Shot blasting is treatment performed for the purpose of cleaning the surface by removal of burrs (projections) generated at the time of a cutting process, a forming process, or the like, and scales (hard oxide films) generated at the time of thermal treatment. Shot peening is a treatment of ejecting small particles onto a surface of a treatment object, and is performed, under a condition in which an outermost surface of the treatment object is plastically deformed, for the purpose of generating compressive residual stress on the surface. Thus, shot peening and shot blasting are different from each other in conditions such as strength.

Thus, in a case of barrel polishing, control of the SK value can be effected by selection of a rotational speed of a barrel polishing machine, a processing time period, a workpiece input amount, a kind and size of a chip, and the like. Further, in a case of shot blasting or shot peening, the control of the SK value can be effected by selection of a kind of an ejection material (particle diameter, composition, density, hardness, and strength), an ejection speed, an ejection angle, an ejection amount, and the like.

As the constant velocity universal joint, it is possible to use one of an undercut-free type in which a groove bottom of each of the guide grooves is provided with a circular-arc portion and a straight portion, or one of a Rzeppa type in which a groove bottom of each of the guide grooves is constituted only by a circular-arc portion.

It is preferred that the constant velocity universal joint according to the present invention be used for a propeller shaft for automobiles.

Advantageous Effects of Invention

According to the constant velocity universal joint of the present invention, in the present invention, the joint load capacity can be increased in accordance with an increase of the depths of the guide grooves. As a result, durability and strength can be enhanced. Further, the contact angles between the guide grooves and the balls can be increased, and hence loads on the guide grooves can be reduced in accordance therewith. Also with this configuration, it is possible to enhance the durability and the strength. Still further, differences in movement distance between the inner race and the balls and between the outer race and the balls are reduced, and hence joint efficiency is enhanced. In addition, with securement of the cage offset, it is possible to compensate for the influence of deterioration in operability, which is caused by reduction of the ratio R1 (small track offset).

By the effect of the fine-recess-shaped depressions provided at random in the ball surface, the groove surface of each of the guide grooves, and the like, the lubricant is retained in the fine-recess-shaped depressions. Therefore, the oil film layer can be maintained in a better state on the contact surfaces of the tracks and the ball. As a result, frictional resistance upon contact is reduced, which leads to enhancement in efficiency of the constant velocity universal joint.

The constant velocity universal joint of the present invention may be of the undercut-free type or of the Rzeppa type, that is, can be formed as one of various types in accordance with various use environments. Thus, it is possible to structure a constant velocity universal joint, which is optimum for a propeller shaft for automobiles.

DETAILED DESCRIPTION OF THE INVENTION

In the following, description is made of an embodiment according to the present invention with reference to FIGS. 1 to 6C.

Figure 1:
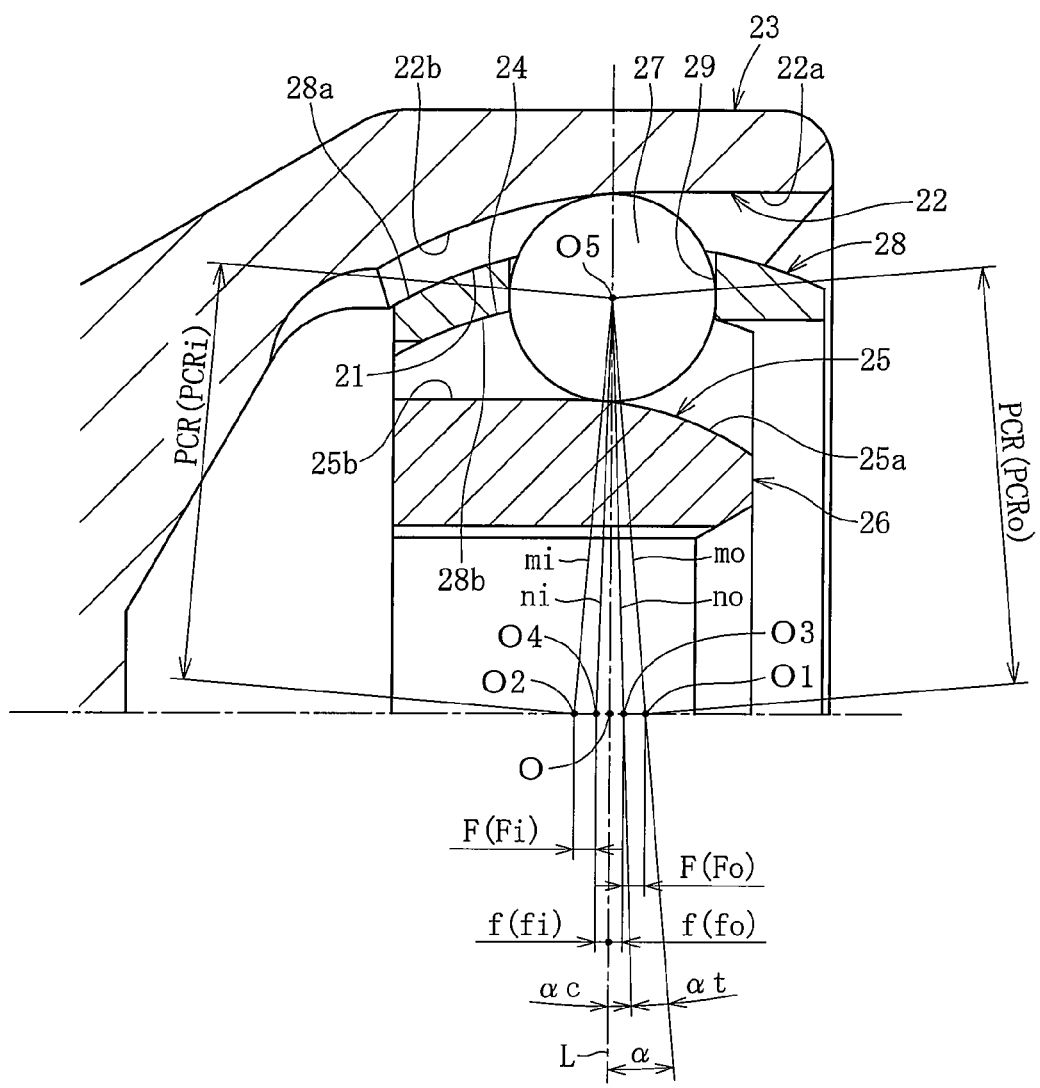
FIG. 1 A sectional view of a fixed type constant velocity universal joint according to a first embodiment of the present invention.

A fixed type constant velocity universal joint according to the present invention includes, as illustrated in FIG. 1, an outer race 23 having an inner surface 21 in which a plurality of guide grooves 22 are formed along an axial direction and serving as an outer joint member, and an inner race 26 having an outer surface 24 in which a plurality of guide grooves 25 are formed along the axial direction and serving as an inner joint member. The guide grooves 22 of the outer race 23 and the guide grooves 25 of the inner race 26 are provided in pairs, and balls 27 for transmitting torque are interposed between the guide grooves 22 of the outer race 23 and the guide grooves 25 of the inner race 26. A cage (retainer) 28 is interposed between the inner surface 21 of the outer race 23 and the outer surface 24 of the inner race 26, and the balls 27 are retained in a plurality of window portions (pockets) 29 arranged at a predetermined pitch along a circumferential direction of the retainer 28.

Each of the guide grooves 22 of the outer race 23 is constituted by an opening-side straight portion 22a (straight portion parallel to an outer-race axis) and an interior-side circular-arc portion 22b. Each of the guide grooves 25 of the inner race 26 is constituted by an opening-side circular-arc portion 25a and an interior-side straight portion 25b (straight portion parallel to the outer-race axis). That is, the fixed type constant velocity universal joint is of an undercut-free type.

Figure 2:
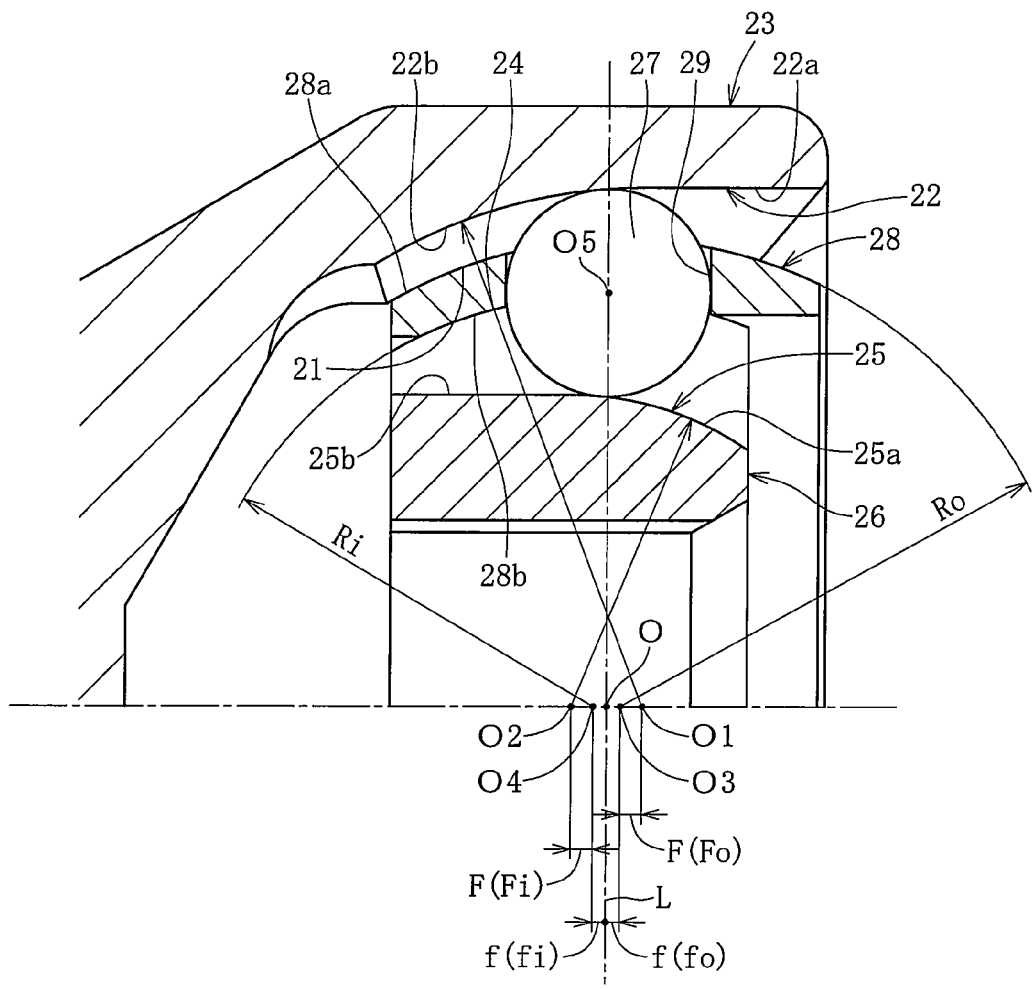
FIG. 2 A sectional view of the fixed type constant velocity universal joint.

As illustrated in FIG. 2, a center curvature O1 of each of the guide grooves 22 of the outer race 23 is shifted in the axial direction from a joint center O toward an opening side of the outer race 23. Further, a center curvature O2 of each of the guide grooves of the inner race 26 is provided on an interior side opposite to the center curvature O1 of each of the guide grooves 22 of the outer race 23 while being separated in the axial direction from the joint center O by an equal distance.

A spherical surface center O3 of an outer surface 28a of the retainer 28 is slightly shifted in the axial direction from the joint center O toward the opening side. Further, a spherical surface center O4 of an inner surface 28b of the retainer 28 is provided on the interior side opposite to the spherical surface center O3 of the outer surface 28a while being separated in the axial direction from the joint center O by an equal distance f. That is, on the assumption that an offset amount f of the spherical surface center O3 is fo and an offset amount f of the spherical surface center O4 is fi, fo=fi is established. An offset amount of the center curvature O1 (dimension between the center curvature O1 and the spherical surface center O3) is Fo, and an offset amount of the center curvature O2 (dimension between the center curvature and the spherical surface center O4) is Fi, and Fo=Fi is established.

Figure 3:
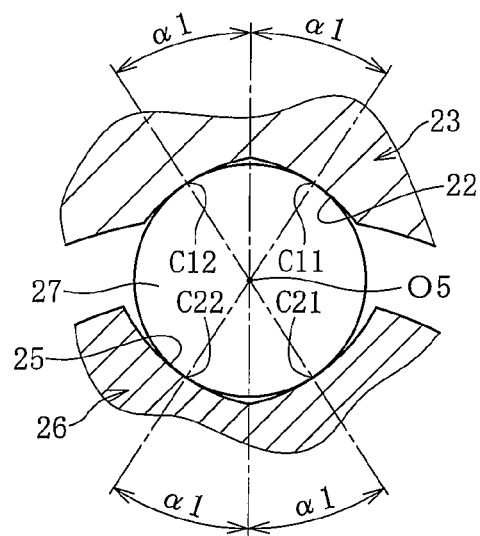
FIG. 3 An enlarged sectional view illustrating a relation between a ball and guide grooves of the fixed type constant velocity universal joint.

The guide grooves 22 of the outer race 23 and the guide grooves 25 of the inner race 26 have Gothic-arch shapes obtained by only a forging process, or by a trimming process after the forging process, or the like. As illustrated in FIG. 3, by adoption of the Gothic-arch shapes, the guide grooves 22 and 25 and the ball 27 are held in angular contact with each other. That is, the ball 27 is held in contact with the guide groove 22 of the outer race 23 at two points C11 and C12, and in contact with the guide groove 25 of the inner race 26 at two points C21 and C22. Angles formed between the following segments are contact angles α1: a segment passing through the joint center O and the center O5 of the ball 27 and a segment passing through each of the contact points C11, C12, C21, and C22 of the guide grooves 22 and 25 and the center O5 of the ball 27. All the contact angles α1 of the contact points C11, C12, C21, and C22 are equal to each other, specifically, set to be 33° to 38°.

As illustrated in FIG. 1, a ratio R1 (Fo/PCRo) of a track offset amount (offset amount) F (Fo) to a length PCR (PCRo) of a segment (line) mo connecting the center curvature O1 of the guide groove 22 of the outer race 23 and the center O5 of the ball 27 to each other is set to range from 0.045 to 0.065. Further, the ratio R1 (Fi/PCRi) of a track offset amount (offset amount) F (Fi) to a length PCR (PCRi) of a segment (line) mi connecting the center curvature O2 of the guide groove 25 of the inner race 26 and the center O5 of the ball 27 to each other is set to range from 0.045 to 0.065. PCRo and PCRi are equal to each other.

Further, an angle formed between the following is αt: the segment (line) mo connecting the center curvature O1 of the guide groove 22 of the outer race 23 and the center O5 of the ball 27 to each other and a segment (line) no connecting the spherical surface center O3 of the outer surface 28a of the retainer 28 and the center O5 of the ball 27 to each other, and an angle formed between the following is αc: the segment (line) no connecting the spherical surface center O3 of the outer surface 28a of the retainer 28 and the center O5 of the ball 27 to each other and a line L connecting the joint center O and the center O5 of the ball 27 to each other. On the assumption that the total of the angles αt and αc is α, As (αt/α) is set to range from 0.45 to 0.65. An angle formed between the following is αt: the segment (line) mi connecting the center curvature O1 of the guide groove 22 of the outer race 23 and the center O5 of the ball 27 to each other and the segment (line) ni connecting the spherical surface center O4 of the inner surface 28b of the retainer 28 and the center O5 of the ball 27 to each other, and an angle formed between the following is αc: a segment (line) ni connecting the spherical surface center O4 of the inner surface 28b of the retainer 28 and the center O5 of the ball 27 to each other and the line L connecting the joint center O and the center O5 of the ball 27 to each other. On the assumption that the total of the angles αt and αc is α, As (αt/α) is set to range from 0.45 to 0.65.

Figure 7:
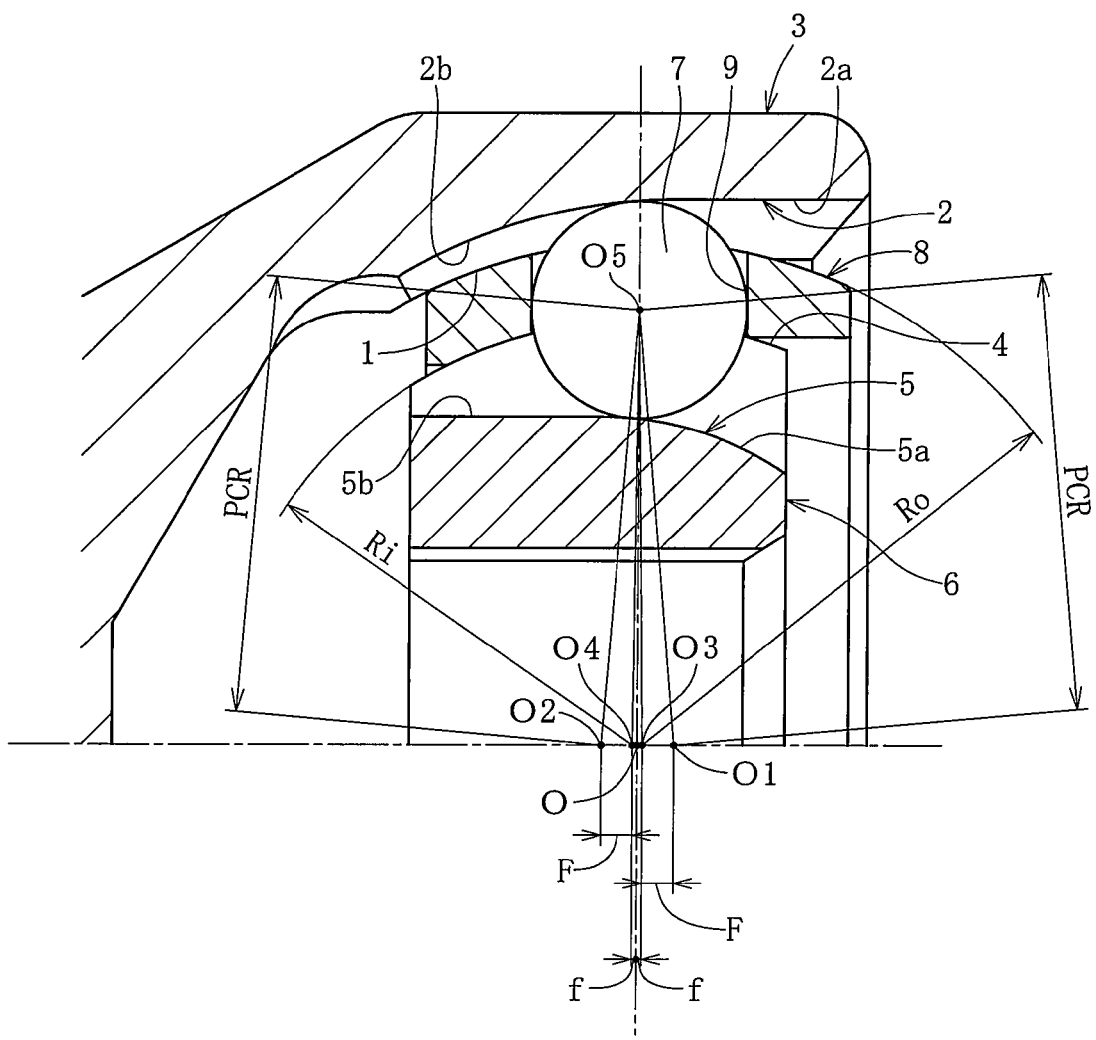
FIG. 7 A sectional view of a conventional fixed type constant velocity universal joint.
Figure 8:
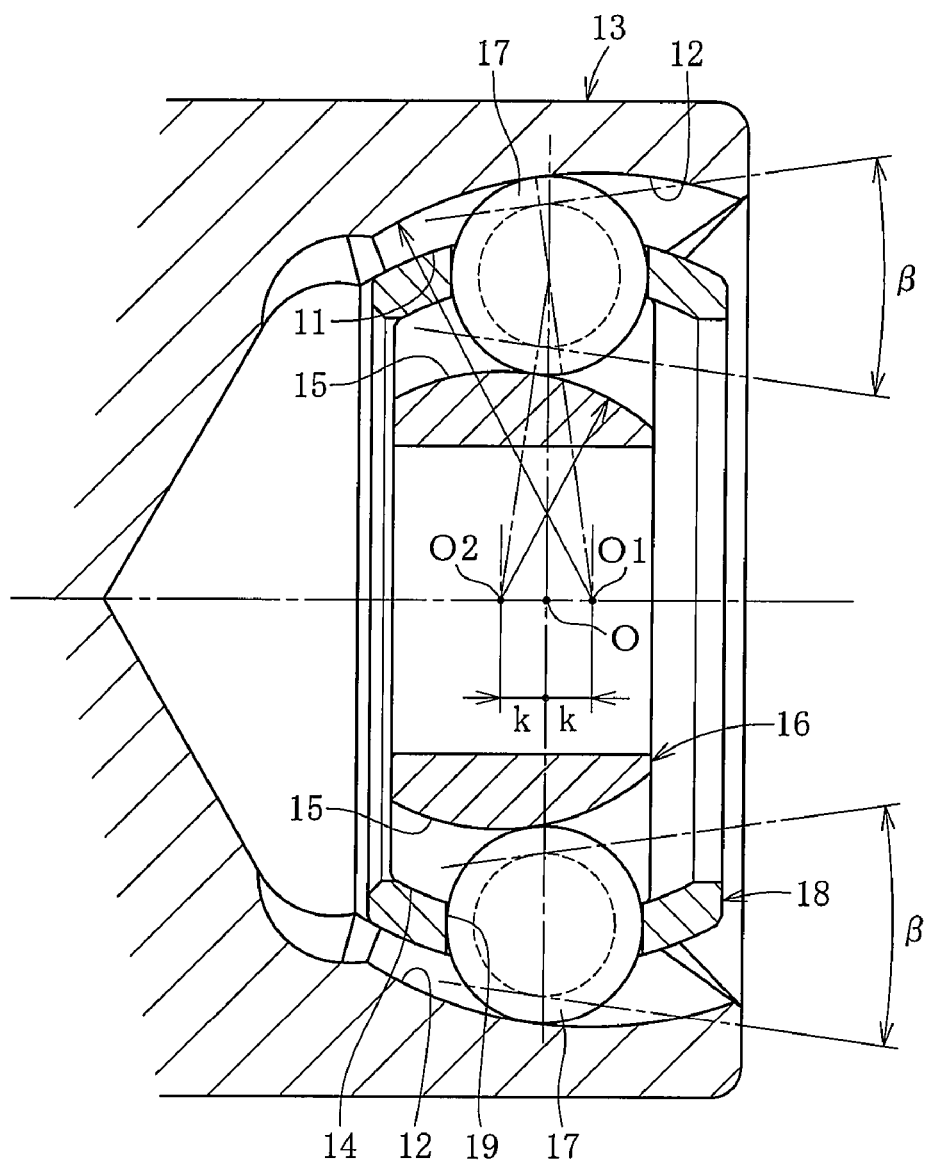
FIG. 8 A sectional view of another conventional fixed type constant velocity universal joint.
Figure 9:
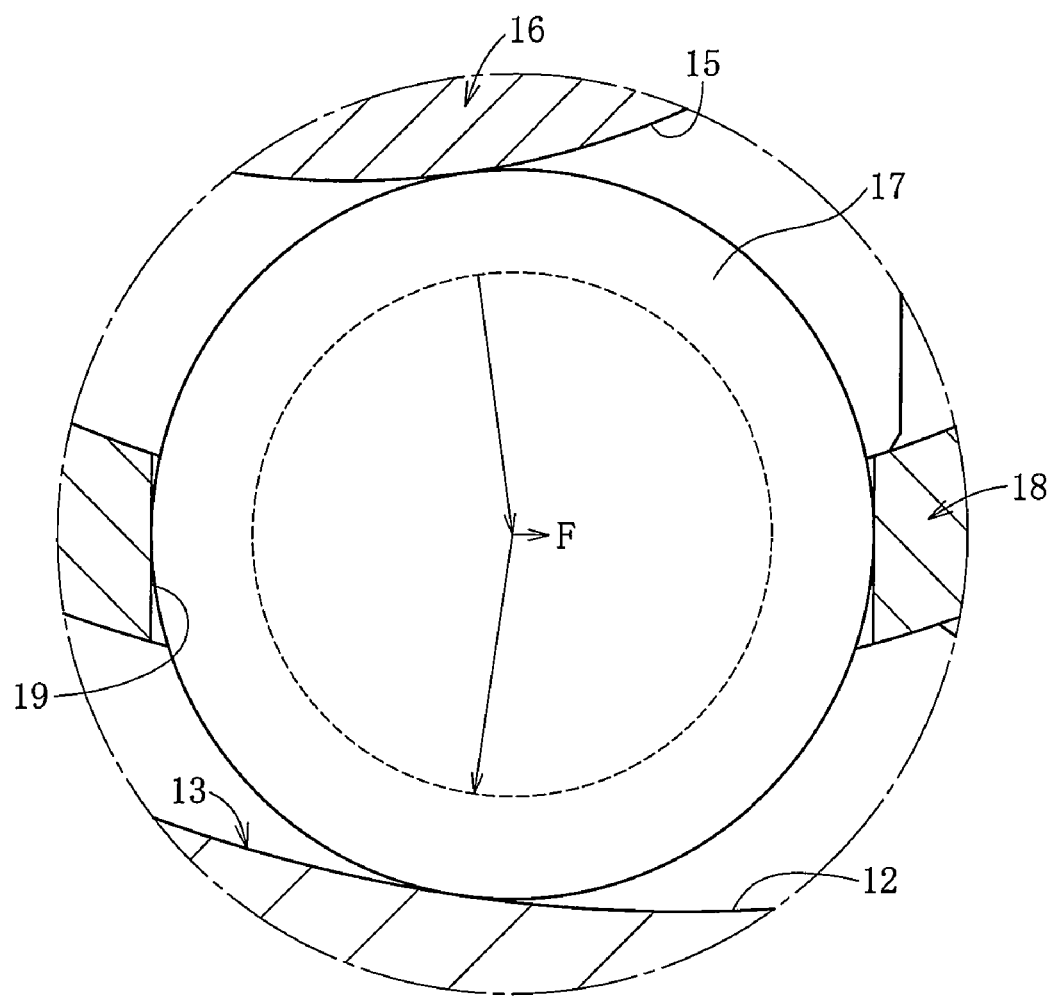
FIG. 9 A view illustrating a pressing force acting on a ball of the fixed type constant velocity universal joint of FIG. 8.
Figure 10:
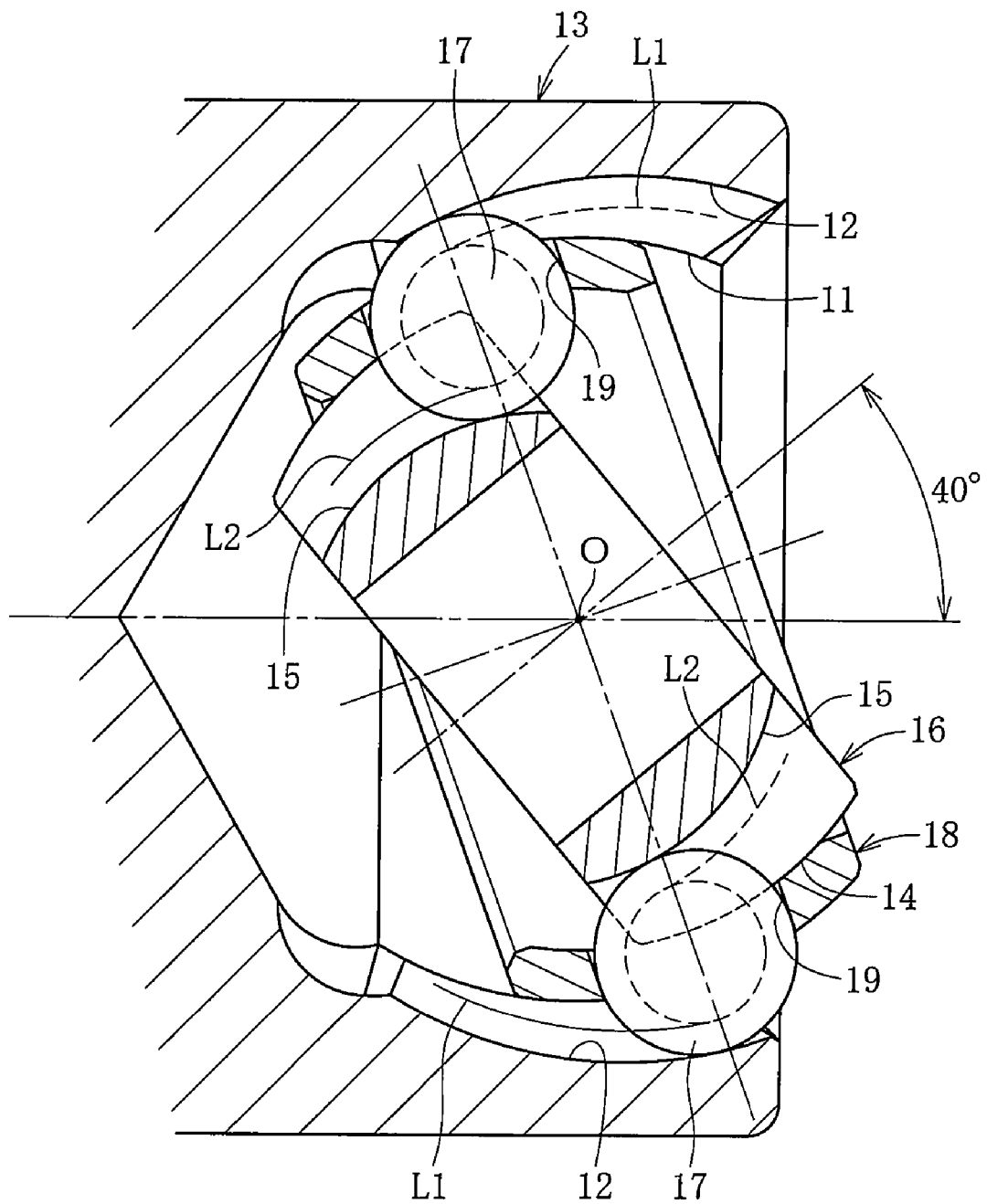
FIG. 10 A sectional view illustrating a state in which the fixed type constant velocity universal joint of FIG. 8 forms an operating angle.
Figure 11:
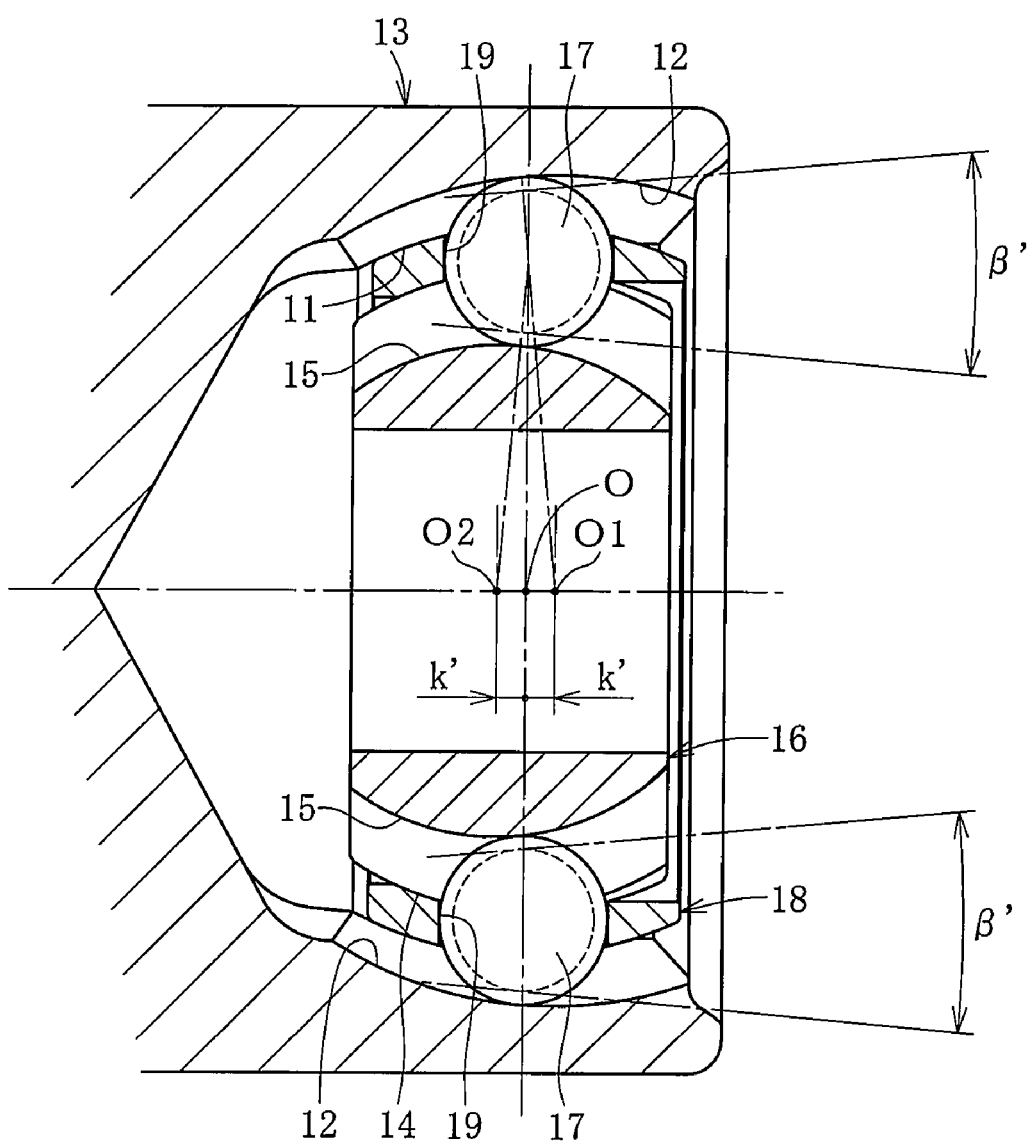
FIG. 11 A sectional view of still another conventional fixed type constant velocity universal joint.
Figure 12:
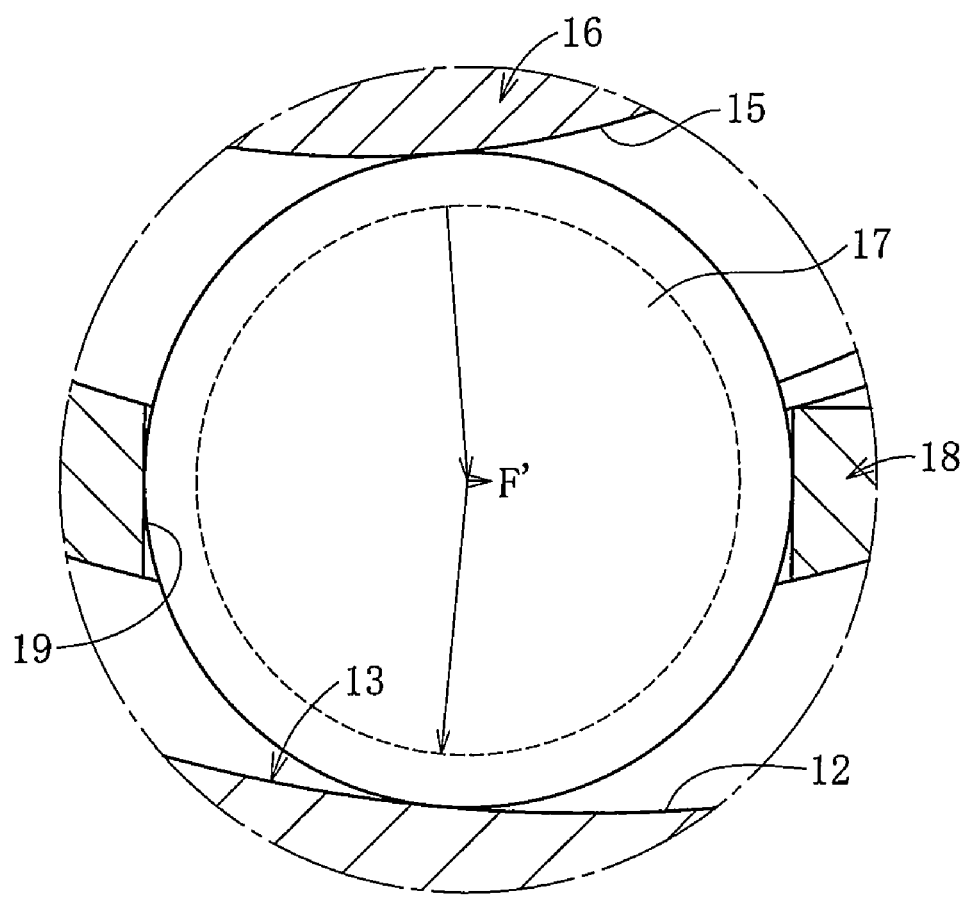
FIG. 12 A view illustrating a pressing force acting on a ball of the fixed type constant velocity universal joint of FIG. 11.
Figure 13:
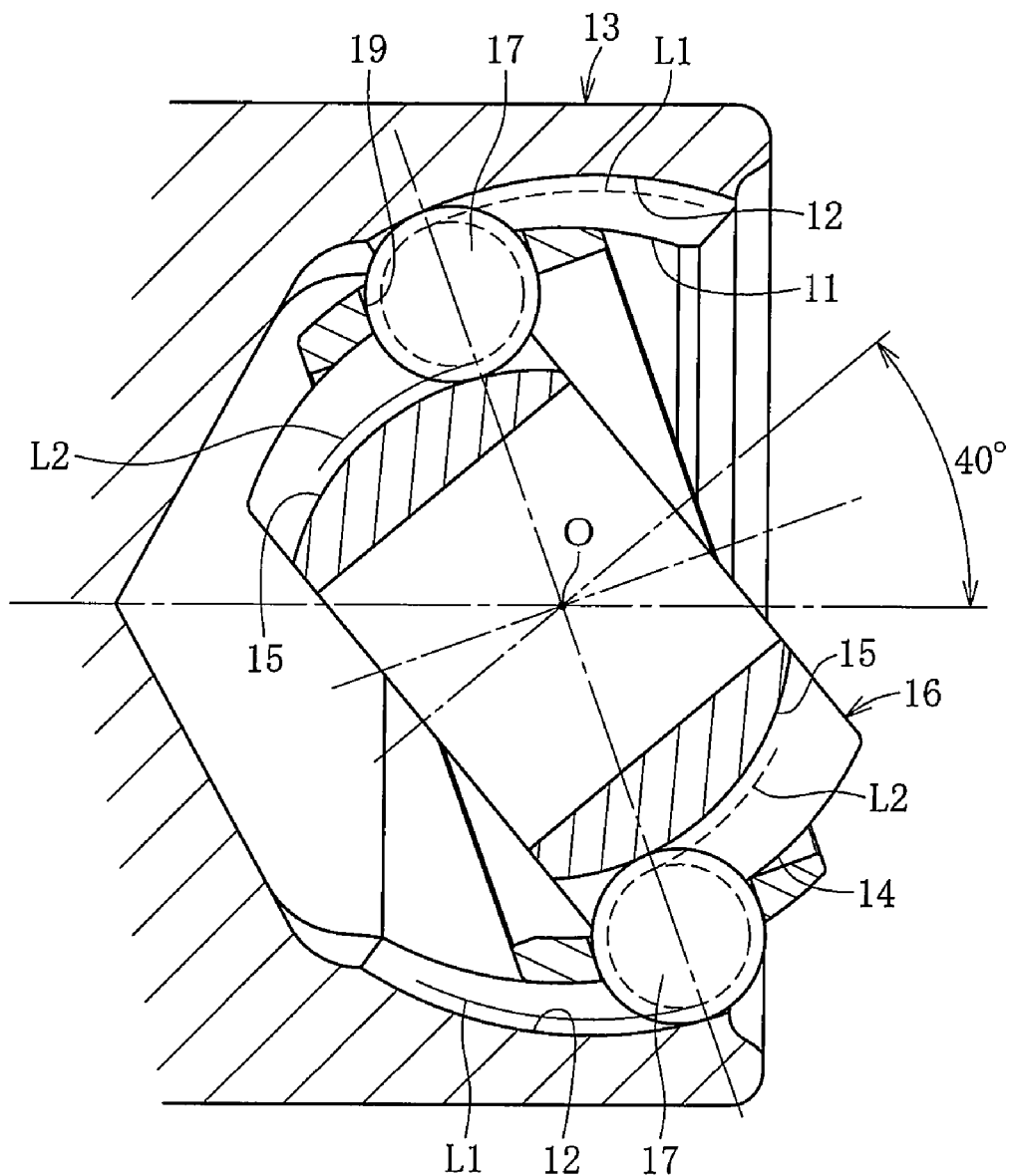
FIG. 13 A sectional view illustrating a state in which the fixed type constant velocity universal joint of FIG. 11 forms an operating angle.

Note that, in the fixed type constant velocity universal joint disclosed in Patent Literatures above, that is, in FIG. 7, F/PCR ranges from 0.069 to 0.121. Further, f/PCR ranges from 0 to 0.052, and hence As (αt/α) ranges from 0.66 to 1.00.

According to the present invention, the following can be achieved: the track offset amounts are reduced, and hence the spherical surface center O3 of the outer surface 28a of the retainer (cage) 28 and the spherical surface center O4 of the inner surface 28b of the retainer (cage) 28 are appropriately offset toward the respective center curvatures O1 and O2 of the guide grooves 22 and 25 with respect to the joint center O; and depths of the guide grooves 22 and 25 are increased while total offset amounts equivalent to those of conventional products are secured. As just described, in accordance with an increase in the depths of the guide grooves 22 and 25, the contact angles α1 (33° to 38°, for example) between the guide grooves 22 and 25 and the ball 27 can be increased. With this configuration, it is possible to increase joint load capacity, and to enhance durability and strength. Further, the contact angles between the guide grooves 22 and 25 and the ball 27 can be increased, and hence loads on the guide grooves 22 and 25 can be reduced in accordance therewith. Also with this configuration, it is possible to enhance the durability and the strength. Still further, with securement of the retainer offset (cage offset), it is possible to compensate for an influence of deterioration in operability, which is caused by reduction of the ratio R1 (small track offset). Yet further, differences in movement distance between the inner race 26 and the balls 27 and between the outer race 23 and the balls 27 are reduced, and hence joint efficiency is enhanced. In addition, with securement of the cage offset, it is possible to compensate the influence of deterioration in operability, which is caused by reduction of the ratio R1 (small track offset). With this configuration, efficiency can be maintained.

Figure 4:
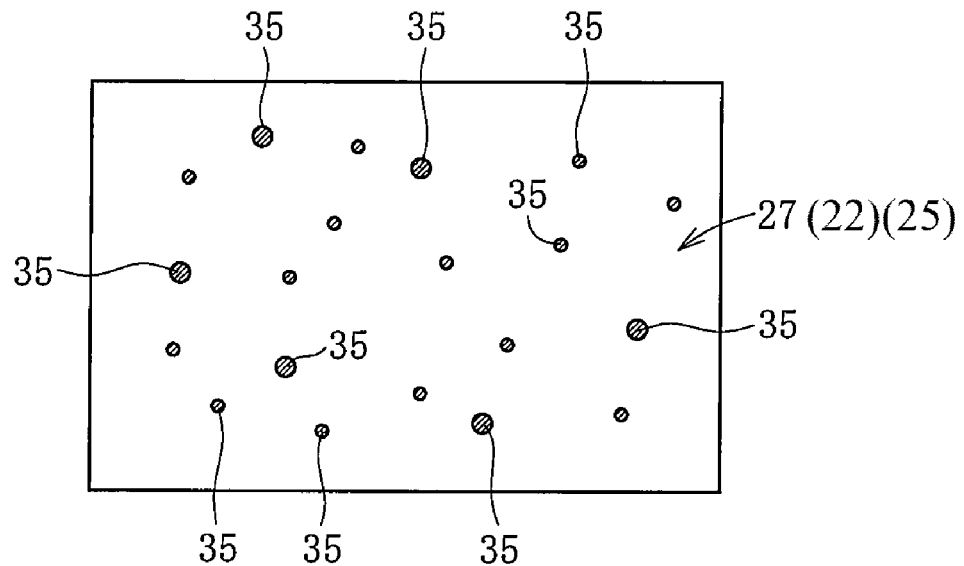
FIG. 4 A schematic view illustrating surface roughness of the balls of the fixed type constant velocity universal joint.

As illustrated in FIG. 4, thousands of fine recessed portions (depressions) 35 each having a size of approximately several tens of μm are formed at random in a ball surface. In this case, surface roughness Ra of the ball surface is set to range from 0.03 to 1.0 μm, preferably, from 0.05 to 0.15 μm. An SK value of a surface roughness parameter is set to −1.6 or less, preferably, to range from −4.9 to −1.6. Further, an area rate of the depressions is set to range from 10 to 30%.

The surface roughness Ra is a value expressed in micrometers (μm), which is obtained by division of an area surrounded by a roughness curve and a center line by a length under a state in which the roughness curve is bent with respect to the center line. That is, the surface roughness Ra is arithmetic-average surface roughness Ra of an "oscillation average parameter in a height direction" among surface roughness parameters according to JIS B 0601-2001. The SK value of a parameter represents a skewness degree (skewness) of the roughness curve (ISO 4287:1997), and is used as a statistic as a measure for understanding of asymmetry of a spike-dip distribution. The SK value approximates 0 in a symmetrical distribution such as a Gaussian distribution, takes a negative value when spikes in the spike-dip distribution are deleted, and takes a positive value in a reverse case.

The surface provided with the fine-recess-shaped depressions 35 is formed by a barrel polishing process, shot blasting, shot peening, or the like. Barrel polishing is a method in which objects to be polished (workpieces) and polishing agents (media) are put into a container (barrel), and surface processings such as burr removal and rounding are performed with relative friction between the workpieces and the media generated by the movement of the barrel. Shot blasting is a treatment performed for the purpose of cleaning the surface by removal of burrs (projections) generated at the time of a cutting process, a forming process, or the like, and scales (hard oxide films) generated at the time of thermal treatment. Shot peening is a treatment of ejecting small particles onto a surface of a treatment object, and is performed, under a condition in which an outermost surface of the treatment object is plastically deformed, for the purpose of generating compressive residual stress on the surface. Thus, shot peening and shot blasting are different from each other in conditions such as strength.

Preferred examples of the surface processing described above include WPC processing, dimple processing, microdimple treatment. In particular, WPC treatment also referred to as fine-particle peening or fine shot peening is more preferred. WPC treatment is a surface reforming treatment of causing fine particles of a material in accordance with a purpose to collide against a surface of a metal component at high speed, the fine particles being mixed in a compressive gas. In this method, rapid heating and rapid cooling are repeated on the outermost surface of the treatment object. Thus, fine and high-toughness compositions are formed and hardened, with the result that the surface is reinforced. Simultaneously, friction and abrasion properties can be enhanced with a change of a surface aspect into those of micro dimples. That is, fatigue resistance and sliding properties can be enhanced with WPC treatment.

A part except the fine recessed portions (micro oil pots) 35 serving as micro dimples is a flat surface, non-directional (isotropic), and has a surface roughness set to be equal to a surface roughness of each of the guide grooves of the inner race 26 and the outer race 23. The fine recessed portions 35 can be formed as micro dimples by selection of optimum media and abrasive grains. In this case, with a change of a grinding condition of the surface, any number of fine recessed portions 35 can be manufactured in any size. For example, a depth of the fine recessed portions 35 is approximately 1 μm. That is, in a case of barrel polishing, control and the like of the SK value can be effected by selection of a rotational speed of a barrel polishing machine, a processing time period, a workpiece input amount, a kind and size of a chip, and the like. Further, in a case of shot blasting or shot peening, the control and the like of the SK value can be effected by selection of a kind of an ejection material (particle diameter, composition, density, hardness, and strength), an ejection speed, an ejection angle, an ejection amount, and the like.

Figure 6A:
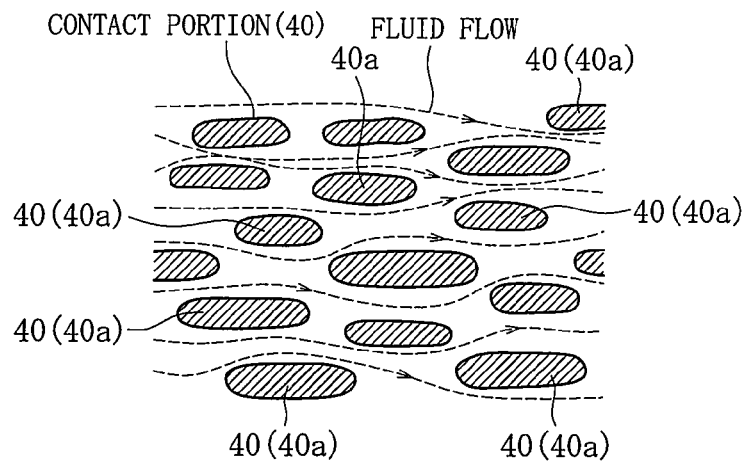
FIG. 6A An explanatory diagram of a case where contact portions have elliptical shapes or oblong shapes and a rolling direction and a processing direction correspond to each other, illustrating change in coefficients relating to the surface roughness of the steel balls and oil film parameters.
Figure 6B:
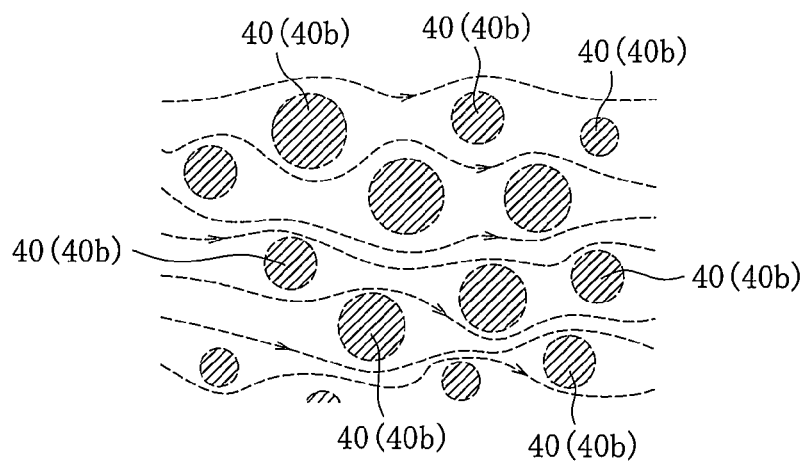
FIG. 6B An explanatory diagram of a case where the contact portions have circular shapes, illustrating change in coefficients relating to the surface roughness of the steel balls and the oil film parameters.
Figure 6C:
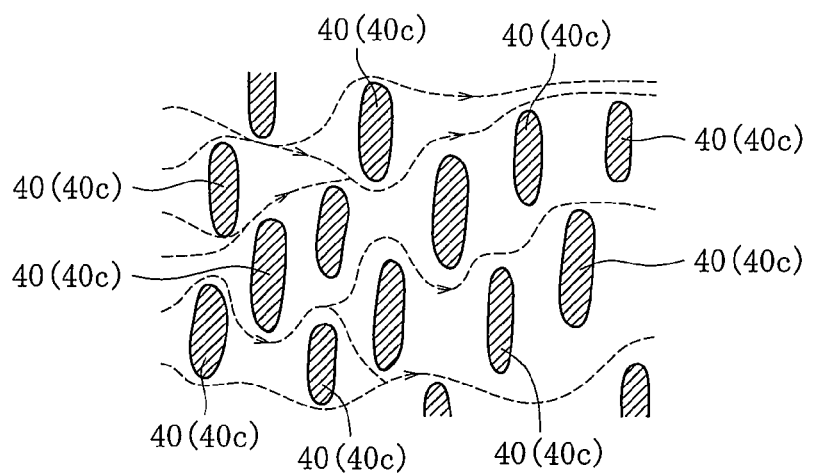
FIG. 6C An explanatory diagram of a case where the contact portions have elliptical shapes or oblong shapes and the rolling direction and the processing direction are orthogonal to each other, illustrating change in coefficients relating to the surface roughness of the steel balls and the oil film parameters.

Incidentally, when lubricating-fluid flow models as illustrated in FIGS. 6A-C are formed, in the lubricating-fluid flow, resistance in a state illustrated in FIG. 6A is higher than those in states illustrated in FIGS. 6B and 6C. Thus, an amount of fluid existing in the contact portions is increased. As a result, an oil-film thickness is increased on a rolling contact surface. In FIGS. 6A, 6B, and 6C, the hatched portions indicate contact portions 40a, 40b, and 40c formed by elastic deformation, and the broken arrows indicate flows of the lubricating fluid. The contact portions 40a and 40c illustrated in FIGS. 6A and 6C have elliptical shapes or oblong shapes, and the contact portions 40b illustrated in FIG. 6B have circular shapes. Further, FIG. 6A illustrates a case where a rolling direction and a processing direction of finished surfaces correspond to each other, and FIG. 6C illustrates a case where the rolling direction and the processing direction of the finished surfaces are orthogonal to each other.

Figure 5:
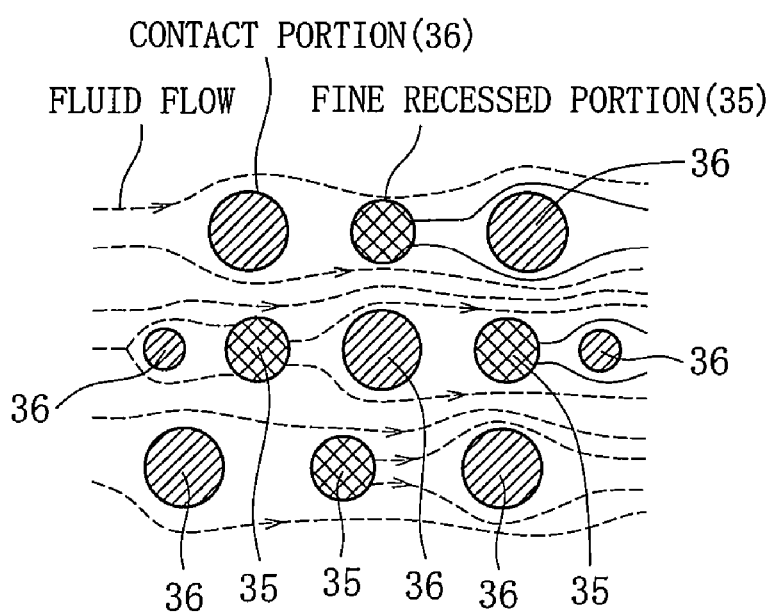
FIG. 5 A model view illustrating a fluid flow in a steel-ball-rolling structure of the present invention.

When the lubricating-fluid flow model is applied to the constant velocity universal joint described above, the model as illustrated in FIG. 5 is obtained. In FIG. 5, the hatched portions indicate elastic contact portions 36, the cross-hatching indicates the fine recessed portions 35, and the broken arrows indicate fluid flows. In this case, the rolling direction extends from left to right in the figure, and the lubricating fluid bypasses the contact portions on a smooth surface and flows on the ball surface while an oil amount is increased in the fine recessed portions 35. Thus, oil films can be formed.

As described above, by random arrangement of the many fine recessed portions 35 each having a size of approximately several tens of μm in the surface of the ball 27 (steel ball), the lubricating fluid bypasses the contact portions on the smooth surface (contact portions with respect to guide groove surfaces of the outer race 23 and the inner race 26), and passes on the ball surface while the oil amount is increased in the fine recessed portions 35. That is, the fine recessed portions (micro oil pots) 35 function so as to impart an oil retention effect to the surface of the ball 27 and the guide groove surfaces.

Further, by random arrangement of the many fine recessed portions 35 each having a size of approximately several tens of μm in the surface of the steel ball (ball 27), the lubricating fluid bypasses the contact portions on the smooth surface (contact portions with respect to guide groove surfaces of the outer race 23 and the inner race 26), and passes on the ball surface while the oil amount is increased in the fine recessed portions 35. That is, the fine recessed portions (micro oil pots) 35 function so as to impart the oil retention effect to the surface of the ball 27 and the guide groove surfaces.

In addition, by setting of the surface roughness Ra of the ball surface to range from 0.03 to 1.0 μm, an oil film layer can be reliably formed between the contact surfaces, that is, the ball surface and counterpart rolling surfaces (guide grooves). By setting of the SK value of the surface roughness parameter to −1.6 or less, the depressions stably serve as oil pools, and hence oil leakage is small in a sliding direction and an orthogonal direction even at the time of compression. As a result, excellent oil-film forming properties are obtained, good oil-film forming condition is achieved, and an effect of suppressing damage on the surface to the minimum is exerted. Further, by setting of the area rate of the depressions to range from 10 to 30%, many depressions for retaining the lubricating oil can be formed at random in the ball surface, and friction can be stably reduced.

Thus, as shown in FIG. 4, instead of the provision of the depressions 35 exerting a micro-oil-pot effect on the ball surface, the depressions 35 may be formed in the groove surfaces of the guide groove 22 of the outer race 23 and the guide groove 25 of the inner race 26. Also in this case, many fine-recess-shaped depressions are provided at random, and the surface roughness Ra of the depressions is set to range from 0.03 to 1.0 μm, preferably, from 0.05 to 0.15 μm. The SK value of a surface roughness parameter of the depressions is set to −1.6 or less, preferably, to range from −4.9 to −1.6. Further, an area rate of the depressions is set to range from 10 to 30%.

As described above, even when the depressions 35 are provided in the groove surfaces of the guide groove 22 of the outer race 23 and the guide groove 25 of the inner race 26, functions and effects which are the same as those in the case of the provision of the depressions 35 in the ball surface can be obtained.

By the effect of the fine-recess-shaped depressions provided at random in the ball surface or the track surface (guide groove surface), the lubricant is retained in the fine-recess-shaped depressions. Therefore, the oil film layer can be maintained in a better state on the contact surfaces of the guide grooves 22 and 25 and the ball 27. As a result, frictional resistance upon contact is reduced, which leads to enhancement in efficiency of the constant velocity universal joint.

The guide grooves 22 of the outer race 23 and the guide grooves 25 of the inner race 26 can be formed by only a forging process, or by a trimming process after the forging process, or the like. In other words, the guide grooves of the inner race 26 and the outer race 23 can be easily formed without any special forming method.

Further, although description of a constant velocity universal joint of an undercut-free type has been made in this embodiment, as another embodiment, a constant velocity universal joint of a Birfield type (Rzeppa type) may be used, in which groove bottoms of track grooves are constituted only by circular-arc portions.

As described above, the constant velocity universal joint according to the present invention can be formed as one of various types in accordance with various use environments. Thus, it is possible to structure a constant velocity universal joint which is optimum for a propeller shaft for automobiles. In particular, in a case of a constant velocity universal joint provided with eight or more torque transmission balls, further compactification and weight reduction can be realized while strength, load capacity, and durability are secured.

Hereinabove, description is made of the embodiment according to the present invention. However, the present invention is not limited to the embodiment described above, and various modifications, as shown in FIG. 4, can be made thereto. For example, the depressions 35 may be provided only in the ball surface, only in the guide groove 22 of the outer race 23, or only in the guide groove 25 of the inner race 26. Alternatively, the depressions 35 may be provided in both the ball surface and the guide groove 22 of the outer race 23, both the ball surface and the guide groove 25 of the inner race 26, or both the guide groove 22 of the outer race 23 and the guide groove 25 of the inner race 26. Further alternatively, the depressions 35 may be provided in all of the ball surface, the guide groove 22 of the outer race 23, and the guide groove 25 of the inner race 26.

In order to realize a higher joint-operating angle, the constant velocity universal joint of the undercut-free type may be used, in which guide groove bottoms are each provided with the circular-arc portion and the straight portion as in the embodiment, or another constant velocity universal joint may be used, which has a shape in which portions corresponding to linear portions of the undercut-free type exhibit tapered shapes. Alternatively, another constant velocity universal joint may be used, in which the guide groove bottoms are provided with a plurality of circular-arc portions having curvature radii different from each other, or in which the center curvature of each of the guide grooves of the outer race and the center curvature of each of the guide grooves of the inner race are offset in a radial direction relative to a joint axis (radial offset). Further alternatively, an arrangement pitch of the guide grooves in the circumferential direction may be an equal pitch or an unequal pitch, and the number of the balls may be arbitrarily increased and reduced.

EXAMPLE 1

As shown in Table 2 below, a performance comparison was made between conventional products in which F/PCR ranged from 0.069 to 0.121 and As ($\alpha t/\alpha$) ranged from 0.66 to 1.00, and products 1 according to the present invention in which F/PCR ranged from 0.045 to 0.065 and $\alpha t/\alpha$ ranged from 0.45 to 0.65.

TABLE 2

|  | R1:F/PCR | As:$\alpha t/\alpha$ |
| --- | --- | --- |
| Products according to the present invention | 0.045 to 0.065 | 0.45 to 0.65 |
| Conventional products | 0.069 to 0.121 | 0.66 to 1.00 |

Table 3 numerically shows the results of the comparison in a form of improvement degree relative to the conventional products. These results prove that the products according to the present invention had higher numerical values in terms of strength, durability, and efficiency, and were improved in those factors in comparison with the conventional products.

TABLE 3

|  | Conventional products | Products according to the present invention |
| --- | --- | --- |
| Strength | 1 | 1.2 |
| Durability | 1 | 2.0 |
| Efficiency | 1 | 1.03 |

EXAMPLE 2

As in the case of the products according to the present invention shown in Table 2 above, a performance comparison was made between the conventional products and products 2 according to the present invention in which F/PCR ranged from 0.045 to 0.065, $\alpha t/\alpha$ ranged from 0.45 to 0.65, and many fine recessed portions 35 were arranged at random in the ball surface. In this case, the surface roughness Ra of the depressions was set to range from 0.03 to 1.0 μm, the SK value of the surface roughness parameter of the depressions was set to −1.6 or less, and in addition, the area rate of the depressions was set to range from 10 to 30%.

Similarly to Table 3, Table 4 numerically shows the results of the comparison in a form of improvement degree relative to the conventional products. These results prove that the products according to the present invention had higher numerical values in terms of strength, durability, and efficiency, and were improved in those factors, especially in efficiency, in comparison with the conventional products.

TABLE 4

|  | Conventional products | Products according to the present invention |
| --- | --- | --- |
| Strength | 1 | 1.2 |
| Durability | 1 | 2.0 |
| Efficiency | 1 | 1.2 |

INDUSTRIAL APPLICABILITY

The constant velocity universal joint of the undercut-free type may be used, in which guide groove bottoms are each provided with the circular-arc portion and the straight portion, or another constant velocity universal joint may be used, which has a shape in which portions corresponding to linear portions of the undercut-free type exhibit tapered shapes. Alternatively, another constant velocity universal joint may be used, in which the guide groove bottoms are provided with a plurality of circular-arc portions having curvature radii different from each other, or in which the center curvature of each of the guide grooves of the outer race and the center curvature of each of the guide grooves of the inner race are offset in a radial direction relative to a joint axis (radial offset).

| Reference Signs List | |
| --- | --- |
| 21 | inner surface |
| 22, 25 | guide groove |
| 24 | outer surface |
| 27 | ball |
| 28 | retainer |
| 28 | outer surface |
| 28b | inner surface |
| 35 | fine recessed portion |

The invention claimed is:

1. A fixed type constant velocity universal joint, comprising:
   an outer joint member having an inner surface in which a plurality of guide grooves are formed;
   an inner joint member having an outer surface in which a plurality of guide grooves are formed;
   a plurality of balls interposed between the plurality of guide grooves of the outer joint member and the plurality of guide grooves of the inner joint member, for transmitting torque; and
   a retainer for retaining the plurality of balls,
   wherein a center of curvature of each of the plurality of guide grooves of the outer joint member and a center of curvature of each of the plurality of guide grooves of the inner joint member are offset to opposite sides of a joint center along a central axis of the fixed type constant velocity universal joint by equal distances, the center of curvature of each of the plurality of guide grooves of the outer joint member being offset from and on a same side of the joint center as a spherical surface center of an outer surface of the retainer, and the center of curvature of each of the plurality of guide grooves of the inner joint member being offset from and on a same side of the joint center as a spherical surface center of an inner surface of the retainer, wherein R1 representing F/PCR falls within a range of $0.045 \leq R1 \leq 0.065$, F being a track offset amount that is a distance between the center of curvature of each of the plurality of guide grooves of the outer joint member and the spherical surface center of the outer surface of the retainer or between the center of curvature of each of the plurality of guide grooves of the inner joint member and the spherical surface center of the inner surface of the retainer, and PCR being a length of a line connecting the center of curvature of each of the plurality of guide grooves of the outer joint member or the center of curvature of each of the plurality of guide grooves of the inner joint member and a center of each of the plurality of balls to each other, and wherein As representing $\alpha t/\alpha$ falls within a range of $0.45 \leq As \leq 0.65$, $\alpha t$ being an angle formed between:

a line connecting the spherical surface center of the outer surface of the retainer or the spherical surface center of the inner surface of the retainer and the center of each of the plurality of balls to each other; and the line connecting the center of curvature of each of the plurality of guide grooves of the outer joint member or the center of curvature of each of the plurality of guide grooves of the inner joint member and the center of each of the plurality of balls to each other, respectively, $\alpha c$ being an angle formed between:

the line connecting the spherical surface center of the outer surface of the retainer or the spherical surface center of the inner surface of the retainer and the center of each of the plurality of balls to each other; and a line connecting the joint center and the center of each of the plurality of balls to each other, and a sum of $\alpha t$ and $\alpha c$ being $\alpha$.

2. A fixed type constant velocity universal joint according to claim 1, wherein contact angles between the plurality of guide grooves of the outer and inner joint members and each of the plurality of balls are set to range from 33° to 38°.

3. A fixed type constant velocity universal joint according to claim 2, wherein a surface of each of the plurality of balls has fine-recess-shaped depressions provided therein.

4. A fixed type constant velocity universal joint according to claim 3, wherein groove surfaces of the plurality of guide grooves of the inner joint member have fine-recess-shaped depressions provided therein.

5. A fixed type constant velocity universal joint according to claim 2, wherein groove surfaces of the plurality of guide grooves of the inner joint member have fine-recess-shaped depressions provided therein.

6. A fixed type constant velocity universal joint according to claim 2, wherein groove surfaces of the plurality of guide grooves of the outer joint member have fine-recess-shaped depressions provided therein.

7. A fixed type constant velocity universal joint according to claim 1, wherein a surface of each of the plurality of balls has fine-recess-shaped depressions provided therein.

8. A fixed type constant velocity universal joint according to claim 7, wherein a surface roughness Ra of the surfaces of the balls provided with the fine-recess-shaped depressions is set to range from 0.03 to 1.0 μm, wherein a skewness degree as a SK value of a surface roughness parameter is set to −1.6 or less for the surfaces provided with the fine-recess-shaped depressions, and wherein an area rate of the fine-recess-shaped depressions is set to range from 10 to 30%.

9. A fixed type constant velocity universal joint according to claim 7, wherein a surface roughness Ra of the surfaces of the balls provided with the fine-recess-shaped depressions is set to range from 0.05 to 0.15 μm, and wherein a skewness degree as a SK value of a surface roughness parameter is set to −4.9 to −1.6 for the surfaces provided with the fine-recess-shaped depressions.

10. A fixed type constant velocity universal joint according to claim 7, wherein the surfaces of the balls provided with the fine-recess-shaped depressions are finished by barrel polishing.

11. A fixed type constant velocity universal joint according to claim 7, wherein the surfaces of the balls provided with the fine-recess-shaped depressions are finished by shot blasting.

12. A fixed type constant velocity universal joint according to claim 7, wherein the surfaces of the balls provided with the fine-recess-shaped depressions are finished by shot peening.

13. A fixed type constant velocity universal joint according to claim 7, wherein groove surfaces of the plurality of guide grooves of the inner joint member have fine-recess-shaped depressions provided therein.

14. A fixed type constant velocity universal joint according to claim 7, wherein groove surfaces of the plurality of guide grooves of the outer joint member have fine-recess-shaped depressions provided therein.

15. A fixed type constant velocity universal joint according to claim 1, wherein groove surfaces of the plurality of guide grooves of the inner joint member have fine-recess-shaped depressions provided therein.

16. A fixed type constant velocity universal joint according to claim 1, wherein groove surfaces of the plurality of guide grooves of the outer joint member have fine-recess-shaped depressions provided therein.

17. A fixed type constant velocity universal joint according to claim 1, wherein a surface of each of the plurality of balls, groove surfaces of the plurality of guide grooves of the inner joint member, and groove surfaces of the plurality of guide grooves of the outer joint member have fine-recess-shaped depressions provided therein.

18. A fixed type constant velocity universal joint according to claim 1, wherein the fixed type constant velocity universal joint is an undercut-free type and each of the plurality of guide grooves of the outer and inner joint members has a groove bottom that is provided with a circular-arc portion and a straight portion.

19. A fixed type constant velocity universal joint according to claim 1, wherein the fixed type constant velocity universal joint is a Rzeppa type and each of the plurality of guide grooves of the outer and inner joint members has a groove bottom that is constituted only by a circular-arc portion.

20. A fixed type constant velocity universal joint according to claim 1, comprising a fixed type constant velocity universal joint to be used for a propeller shaft for automobiles.

* * * * *